(12) United States Patent
Yin et al.

(10) Patent No.: US 11,055,818 B2
(45) Date of Patent: Jul. 6, 2021

(54) PANORAMA IMAGE ALIGNMENT METHOD AND DEVICE BASED ON MULTIPATH IMAGES, AND PORTABLE TERMINAL

(71) Applicant: ARASHI VISION INC., Shenzhen (CN)

(72) Inventors: Chenglong Yin, Shenzhen (CN); Wenjie Jiang, Shenzhen (CN); Jingkang Liu, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 0 days.

(21) Appl. No.: 16/609,202

(22) PCT Filed: Apr. 26, 2018

(86) PCT No.: PCT/CN2018/084653
§ 371 (c)(1),
(2) Date: Oct. 28, 2019

(87) PCT Pub. No.: WO2018/196818
PCT Pub. Date: Nov. 1, 2018

(65) Prior Publication Data
US 2020/0058097 A1     Feb. 20, 2020

(30) Foreign Application Priority Data
Apr. 28, 2017   (CN) .................. 201710295870.X

(51) Int. Cl.
*G06T 3/40* (2006.01)
*G06T 7/33* (2017.01)

(52) U.S. Cl.
CPC ............ *G06T 3/4038* (2013.01); *G06T 7/337* (2017.01); *G06T 2200/32* (2013.01)

(58) Field of Classification Search
None
See application file for complete search history.

(56) References Cited

U.S. PATENT DOCUMENTS 6,486,908 B1 * 11/2002 Chen ..................... G06T 3/0018
345/441
7,259,715 B1 * 8/2007 Garren ................ G01S 13/9027
342/179

(Continued)

FOREIGN PATENT DOCUMENTS

| CN | 101877140 A | 11/2010 |
| CN | 104333675 A | 2/2015 |
| CN | 107123136 A | 9/2017 |

OTHER PUBLICATIONS

Yanli Li, "Study of Panoramic Stitching", Shandong University Master's Thesis, Apr. 5, 2007, pp. 1-45, Sandong University, China.

*Primary Examiner* — Gregory M Desire
(74) *Attorney, Agent, or Firm* — Cheng-Ju Chiang

(57) ABSTRACT

A panorama image alignment method method comprises: obtaining multipath spherical images; calculating rotation Euler angles between each spherical image and a middle portion, a left portion and a right portion of an adjacent spherical image according to a middle portion, a left portion and a right portion of each spherical image to obtain a first left portion rotation matrix and a second right portion rotation matrix; obtaining a first left panorama image, a first right panorama image, a second left panorama image and a second right panorama image; aligning the second left panorama image to the first left panorama image, obtaining a second left portion rotation matrix by means of calculation, and then obtaining a rotation matrix of a left panorama; aligning the second right panorama image to the first right panorama image, obtaining a second right portion rotation matrix by means of calculation, and obtaining a rotation matrix of a right panorama.

9 Claims, 1 Drawing Sheet

(56) References Cited

U.S. PATENT DOCUMENTS

| | | | |
|---|---|---|---|
| 9,626,589 B1* | 4/2017 | Graham | G06T 7/0002 |
| 9,900,505 B2* | 2/2018 | Perazzi | G06T 3/4038 |
| 9,978,120 B2* | 5/2018 | Bai | G06T 11/60 |
| 10,080,009 B2* | 9/2018 | Fan | H04N 5/23254 |
| 2014/0267593 A1 | 9/2014 | Kim et al. | |
| 2018/0035047 A1* | 2/2018 | Lei | G02B 13/06 |
| 2018/0295293 A1* | 10/2018 | Sun | H04N 5/23238 |
| 2020/0058097 A1* | 2/2020 | Yin | G06T 7/337 |

* cited by examiner

PANORAMA IMAGE ALIGNMENT METHOD AND DEVICE BASED ON MULTIPATH IMAGES, AND PORTABLE TERMINAL

CROSS REFERENCE TO RELATED APPLICATIONS

The present application is a 35 U.S.C. § 371 National Phase conversion of International (PCT) Patent Application No. PCT/CN2018/084653, filed on Apr. 26, 2018, which claims priority of Chinese Patent Application No. 201710295870.X, filed on Apr. 28, 2017, the disclosure of which is incorporated by reference herein. The PCT International Patent Application was filed and published in Chinese.

FIELD OF THE INVENTION

The present invention relates to a field of image processing, more specifically, to a panorama image alignment method and device based on multipath images, and portable terminal.

BACKGROUND OF THE INVENTION

In prior art, when stitching a panorama image, a left image and right image are usually stitched via the same rotation matrix, which results a large stitching gap between the left image and the right image. In order to overcome the problem of the large stitching gap due to using the same rotation matrix to stitch image, the left image and the right image are separately stitched, however, some of both the left image and the right image in the panorama image have small parallax, and some have large parallax, which affects 3D feature of the panorama image.

SUMMARY OF THE INVENTION

Technical Problem

The present invention aims to provide a panorama image alignment method and device based on multipath images, and portable terminal, which solve the problems that when the left image and the right image are separately stitched, some of both the left image and the right image in the panorama image have small parallax, and some have large parallax, which affects 3D feature of the panorama image.

Technical Solution

A first aspect of the present invention provides a panorama image alignment method based on multipath images, comprising steps of:
capturing multipath spherical images used for stitching a panorama image and respectively mapped to a unit sphere; intercepting a middle part of each spherical image, calculating a middle rotation Euler angle between each spherical image and the adjacent spherical image according to the middle part of each spherical image respectively; intercepting a left part of each spherical image, calculating a left rotation Euler angle between each spherical image and the adjacent spherical image according to the left part of each spherical image respectively to obtain a first left rotation matrix; and intercepting a right part of each spherical image, calculating a right rotation Euler angle between each spherical image and the adjacent spherical image according to the right part of each spherical image respectively to obtain a first right rotation matrix;
stitching the left part of a spherical image using the middle rotation Euler angle of all spherical images to obtain a first left panorama image; stitching the right part of a spherical image using the middle rotation Euler angle of all spherical images to obtain a first right panorama image; stitching the left part of a spherical image using the left rotation Euler angle of all spherical images to obtain a second left panorama image; and stitching the right part of a spherical image using the right rotation Euler angle of all spherical images to obtain a second right panorama image;
aligning the second left panorama image to the first left panorama image and calculating to obtain a second left rotation matrix, and a rotation matrix of the left panorama image equal to the first left rotation matrix being multiplied by the second left rotation matrix, thereby obtaining the left rotation Euler angle of the left panorama image aligned; aligning the second right panorama image to the first right panorama image and calculating to obtain a second right rotation matrix, and a rotation matrix of the right panorama image equal to the first right rotation matrix being multiplied by the second right rotation matrix, thereby obtaining the right rotation Euler angle of the right panorama image aligned.

A second aspect of the present invention provides a panorama image alignment device based on multipath images, comprises:
capturing units, for capturing multipath spherical images used for stitching a panorama image and mapped to a unit sphere respectively; a calculating unit, for intercepting a middle part of each spherical image, calculating a middle rotation Euler angle between each spherical image and the adjacent spherical image according to the middle part of each spherical image respectively; intercepting a left part of each spherical image, calculating a left rotation Euler angle between each spherical image and the adjacent spherical image according to the left part of each spherical image respectively to obtain a first left rotation matrix; and intercepting a right part of each spherical image, calculating a right rotation Euler angle between each spherical image and the adjacent spherical image according to the right part of each spherical image respectively to obtain a first right rotation matrix;
a stitching unit, for stitching the left part of a spherical image using the middle rotation Euler angle of all spherical images to obtain a first left panorama image, stitching the right part of a spherical image using the middle rotation Euler angle of all spherical mages to obtain a first right panorama image, stitching the left part of a spherical image using the left rotation Euler angle of all spherical images to obtain a second left panorama image, and stitching the right part of a spherical image using the right rotation Euler angle of all spherical images to obtain a second right panorama image; and
an aligning unit, for aligning the second left panorama image to the first left panorama image and calculating to obtain a second left rotation matrix, and a rotation matrix of the left panorama image equal to the first left rotation matrix being multiplied by the second left rotation matrix, thereby obtaining the left rotation Euler angle of the left panorama image aligned; aligning the second right panorama image to the first right panorama image and calculating to obtain a second right rotation matrix, and a rotation matrix of the right panorama image equal to the first right rotation matrix being multiplied by the second right rotation matrix, thereby obtaining the right rotation Euler angle of the right panorama image aligned.

A third aspect of the present invention is to provide a computer readable medium stored thereon computer program for electronic data exchange that enables a computer to perform a panorama image alignment method based on multipath images described above.

A fourth aspect of the present invention is to provide a portable terminal, comprises:

one or more processors;

a memory; and one or more computer programs, being stored on the memory and configured to be executed by the one or more processors, the computer program comprising computer instructions to perform the steps of:

capturing multipath spherical images used for stitching a panorama image and mapped to a unit sphere respectively;

intercepting a middle part of each spherical image, calculating a middle rotation Euler angle between each spherical image and the adjacent spherical image according to the middle part of each spherical image respectively; intercepting a left part of each spherical image, calculating a left rotation Euler angle between each spherical image and the adjacent spherical image according to the left part of each spherical image respectively to obtain a first left rotation matrix; and intercepting a right part of each spherical image, calculating a right rotation Euler angle between each spherical image and the adjacent spherical image according to the right part of each spherical image respectively to obtain a first right rotation matrix;

stitching the left part of a spherical image using the middle rotation Euler angle of all spherical images to obtain a first left panorama image; stitching the right part of a spherical image using the middle rotation Euler angle of all spherical mages to obtain a first right panorama image; stitching the left part of a spherical image using the left rotation Euler angle of all spherical images to obtain a second left panorama image; and stitching the right part of a spherical image using the right rotation Euler angle of all spherical images to obtain a second right panorama image;

aligning the second left panorama image to the first left panorama image and calculating to obtain a second left rotation matrix, and a rotation matrix of the left panorama image equal to the first left rotation matrix being multiplied by the second left rotation matrix, thereby obtaining the left rotation Euler angle of the left panorama image aligned; aligning the second right panorama image to the first right panorama image and calculating to obtain a second right rotation matrix, and a rotation matrix of the right panorama image equal to the first right rotation matrix being multiplied by the second right rotation matrix, thereby obtaining the right rotation Euler angle of the right panorama image aligned.

Advantages

In the present invention, aligning the second left panorama image to the first left panorama image and calculating to obtain a second left rotation matrix, and a rotation matrix of the left panorama image equal to the first left rotation matrix being multiplied by the second left rotation matrix, thereby obtaining the left rotation Euler angle of the left panorama image aligned; aligning the second right panorama image to the first right panorama image and calculating to obtain a second right rotation matrix, and a rotation matrix of the right panorama image equal to the first right rotation matrix being multiplied by the second right rotation matrix, thereby obtaining the right rotation Euler angle of the right panorama image aligned. therefore, the panorama image alignment based on multipath images is performed, and the 3D feature of panorama image is good.

DETAILED DESCRIPTION OF THE INVENTION

Objects, features and advantages of the present invention will be more apparent upon consideration of the following detailed description and taken in conjunction with the accompanying drawings. It should be understood that the detail embodiments described herein are used only to explain the invention, but not intended to limit the scope of the present invention.

The following detail embodiments are used to explain the features of the invention.

First Embodiment

Figure 1:
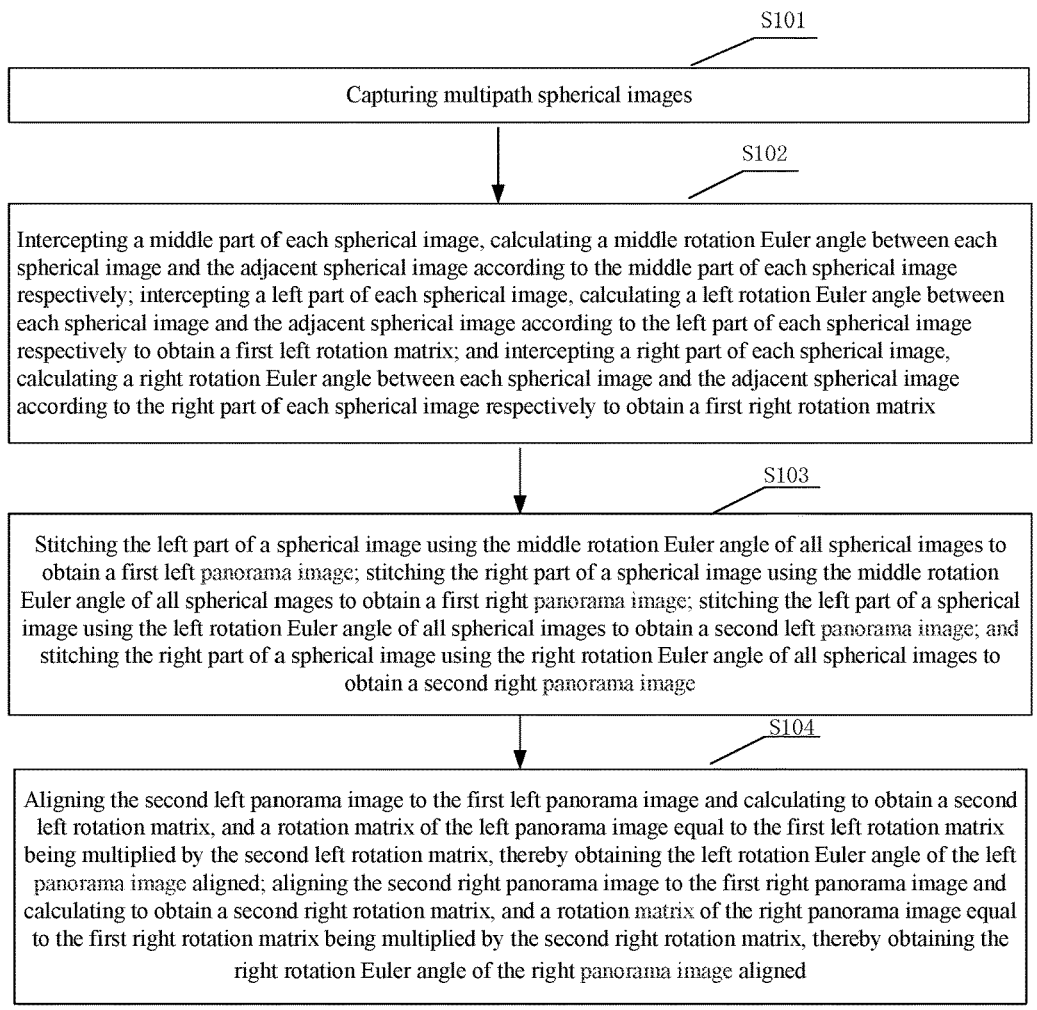
FIG. 1 is a flowchart illustrating a panorama image alignment method based on multipath images in accordance with a first embodiment of the present invention.

Referring to FIG. 1, in the first embodiment of the present invention, a panorama image alignment method based on multipath images, comprises steps of:

S101, capturing multipath spherical images used for stitching a panorama image and mapped to a unit sphere respectively; and S102, intercepting a middle part of each spherical image, calculating a middle rotation Euler angle $roll_{mid}$, $pitch_{mid}$, $yaw_{mid}$ between each spherical image and the adjacent spherical image according to the middle part of each spherical image respectively; intercepting a left part of each spherical image, calculating a left rotation Euler angle $roll_{left0}$, $pitch_{left0}$, $yaw_{left0}$ between each spherical image and the adjacent spherical image according to the left part of each spherical image respectively to obtain a first left rotation matrix $R_{left0}$; and intercepting a right part of each spherical image, calculating a right rotation Euler angle $roll_{right0}$, $pitch_{right0}$, $yaw_{right0}$ between each spherical image and the adjacent spherical image according to the right part of each spherical image respectively to obtain a first right rotation matrix $R_{right0}$.

Where in the first embodiment of the present invention, the step of calculating a middle rotation Euler angle $roll_{mid}$, $pitch_{mid}$, $yaw_{mid}$ between each spherical image and the adjacent spherical image according to the middle part of each spherical image respectively, may further comprise steps of:

intercepting a middle part of each spherical image;

extracting a plurality of feature points of the middle part of each spherical image;

matching the plurality of feature points between the middle parts of each spherical image and the adjacent spherical image to obtain feature point pairs; and obtaining a rotation Euler angle at a minimum distance sum of the feature point pairs in a rotation process of the spherical image, and being defined as the middle rotation Euler angle $\text{roll}_{mid}$, $\text{pitch}_{mid}$, $\text{yaw}_{mid}$ between each spherical image and the adjacent spherical image for each spherical image.

Where in the first embodiment of the present invention, the step of calculating a left rotation Euler angle $\text{roll}_{left0}$, $\text{pitch}_{left0}$, $\text{yaw}_{left0}$ between each spherical image and the adjacent spherical image according to the left part of each spherical image respectively, may further comprise steps of:

intercepting a left part of each spherical image;

extracting a plurality of feature points of the left part of each spherical image;

matching the plurality of feature points between the right parts of each spherical image and the adjacent spherical image to obtain feature point pairs; and obtaining a rotation Euler angle at a minimum distance sum of the feature point pairs in a rotation process of the spherical image, and being defined as the left rotation Euler angle $\text{roll}_{left0}$, $\text{pitCh}_{left0}$, $\text{yaw}_{left0}$ between each spherical image and the adjacent spherical image for each spherical image.

Where in the first embodiment of the present invention, the step of calculating a right rotation Euler angle $\text{roll}_{right0}$, $\text{pitch}_{right0}$, $\text{yaw}_{right0}$ between each spherical image and the adjacent spherical image according to the right part of each spherical image respectively, may further comprise steps of:

intercepting a right part of each spherical image;

extracting a plurality of feature points of the right part of each spherical image;

matching the plurality of feature points between the right parts of each spherical image and the adjacent spherical image to obtain feature point pairs; and obtaining a rotation Euler angle at a minimum distance sum of the feature point pairs in a rotation process of the spherical image, and being defined as the right rotation Euler angle $\text{roll}_{right0}$, $\text{pitch}_{right0}$, $\text{yaw}_{right0}$ between each spherical image and the adjacent spherical image for each spherical image.

S103, stitching the left part of a spherical image using the middle rotation Euler angle $\text{roll}_{mid}$, $\text{pitch}_{mid}$, $\text{yaw}_{mid}$ of all spherical images to obtain a first left panorama image $I_{left0}$; stitching the right part of a spherical image using the middle rotation Euler angle $\text{roll}_{mid}$, $\text{pitch}_{mid}$, $\text{yaw}_{mid}$ of all spherical images to obtain a first right panorama image $I_{right0}$ stitching the left part of a spherical image using the left rotation Euler angle $\text{roll}_{left0}$, $\text{pitch}_{left0}$, $\text{yaw}_{left0}$ of all spherical images to obtain a second left panorama image $I_{left1}$; and stitching the right part of a spherical image using the right rotation Euler angle $\text{roll}_{left0}$, $\text{pitch}_{left0}$, $\text{yaw}_{left0}$ of all spherical images to obtain a second right panorama image $I_{right1}$.

Wherein, the stitching method can use the method of stitching a real-time panorama image disclosed in Pat Pub. No CN106023070A published at the date of the 12 Oct. 2016, or use other stitching methods in prior art, and repetitious details need not be given here.

S104, aligning the second left panorama image $I_{left1}$ to the first left panorama image $I_{left0}$ and calculating to obtain a second left rotation matrix $R_{left1}$ and a rotation matrix of the left panorama image $R_{left2}=R_{left0}*R_{left1}$, thereby obtaining the left rotation Euler angle $\text{roll}_{left1}$, $\text{pitch}_{left1}$, $\text{yaw}_{left1}$ of the left panorama image aligned; aligning the second right panorama image $I_{right1}$ to the first right panorama image $I_{right0}$ and calculating to obtain a second right rotation matrix $R_{right1}$ and a rotation matrix of the right panorama image $R_{right2}=R_{right0}*R_{right1}$, thereby obtaining the right rotation Euler angle $\text{roll}_{right1}$, $\text{pitch}_{right1}$, $\text{yaw}_{right1}$ of the right panorama image aligned.

Where in the first embodiment of the present invention, the step of aligning the second left panorama image $I_{left1}$ to the first left panorama image $I_{left0}$ and calculating to obtain a second left rotation matrix $R_{left1}$, further comprise steps of:

mapping the first left panorama image $I_{left0}$ to a first cube $C_{left0}$ and mapping the second left panorama image $I_{left1}$ to a second cube $C_{left1}$;

extracting feature point pairs F of each face of both the first cube $C_{left0}$ and the second cube $C_{left1}$ respectively; and calculating an optimal second left rotation matrix $R_{left1}$ to minimize a sum of the distances of F.

Where the step of aligning the second right panorama image $I_{right1}$ to the first right panorama image $I_{right0}$ and calculating to obtain a second right rotation matrix $R_{right1}$, further comprise steps of:

mapping the first right panorama image $I_{right0}$ to a third cube $C_{right0}$, and mapping the second right panorama image $I_{right1}$ to a fourth cube $C_{right1}$;

extracting feature point pairs F of each face of both the third cube $C_{right0}$ and the fourth cube $C_{right1}$ respectively; and calculating an optimal second right rotation matrix $R_{left1}$ to minimize a sum of the distances of F.

Second Embodiment

Figure 2:
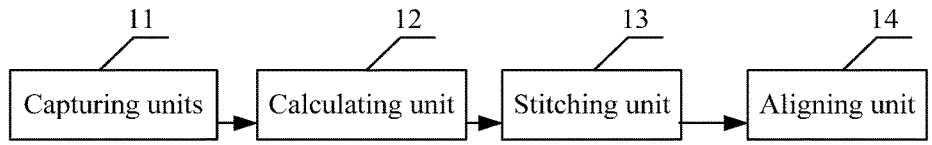
FIG. 2 is a schematic diagram illustrating a panorama image alignment device based on multipath images in accordance with a second embodiment of the present invention.

Referring to FIG. 2, a panorama image alignment device based on multipath images in accordance with a second embodiment of the present invention, comprises:

capturing units 11, for capturing multipath spherical images used for stitching a panorama image and mapped to a unit sphere respectively;

calculating unit 12, for intercepting a middle part of each spherical image, calculating a middle rotation Euler angle between each spherical image and the adjacent spherical image according to the middle part of each spherical image respectively; intercepting a left part of each spherical image, calculating a left rotation Euler angle between each spherical image and the adjacent spherical image according to the left part of each spherical image respectively to obtain a first left rotation matrix; and intercepting a right part of each spherical image, calculating a right rotation Euler angle between each spherical image and the adjacent spherical image according to the right part of each spherical image respectively to obtain a first right rotation matrix;

stitching unit 13, for stitching the left part of a spherical image using the middle rotation Euler angle of all spherical images to obtain a first left panorama image, stitching the right part of a spherical image using the middle rotation Euler angle of all spherical mages to obtain a first right panorama image, stitching the left part of a spherical image using the left rotation Euler angle of all spherical images to obtain a second left panorama image, and stitching the right part of a spherical image using the right rotation Euler angle of all spherical images to obtain a second right panorama image:

aligning unit 14, for aligning the second left panorama image to the first left panorama image and calculating to obtain a second left rotation matrix, and a rotation matrix of the left panorama image equal to the first left rotation matrix being multiplied by the second left rotation matrix, thereby obtaining the left rotation Euler angle of the left panorama image aligned; aligning the second right panorama image to the first right panorama image and calculating to obtain a second right rotation matrix, and a rotation matrix of the right panorama image equal to the first right rotation matrix being multiplied by the second right rotation matrix, thereby obtaining the right rotation Euler angle of the right panorama image aligned.

Where in the second embodiment of the present invention, a step of calculating a middle rotation Euler angle between each spherical image and the adjacent spherical image according to the middle part of each spherical image respectively, may further comprise steps of:

intercepting a middle part of each spherical image;

extracting a plurality of feature points of the middle part of each spherical image;

matching the plurality of feature points between the middle parts of each spherical image and the adjacent spherical image to obtain feature point pairs; and obtaining a rotation Euler angle at a minimum distance sum of the feature point pairs in a rotation process of the spherical image, and being defined as the middle rotation Euler angle between each spherical image and the adjacent spherical image for each spherical image.

A step of calculating a left rotation Euler angle between each spherical image and the adjacent spherical image according to the left part of each spherical image respectively, may further comprise steps of:

intercepting a left part of each spherical image;

extracting a plurality of feature points of the left part of each spherical image;

matching the plurality of feature points between the left parts of each spherical image and the adjacent spherical image to obtain feature point pairs; and obtaining a rotation Euler angle at a minimum distance sum of the feature point pairs in a rotation process of the spherical image, and being defined as the left rotation Euler angle between each spherical image and the adjacent spherical image for each spherical image.

A step of calculating a right rotation Euler angle between each spherical image and the adjacent spherical image according to the right part of each spherical image respectively, may further comprise steps of:

intercepting a right part of each spherical image;

extracting a plurality of feature points of the right part of each spherical image;

matching the plurality of feature points between the right parts of each spherical image and the adjacent spherical image to obtain feature point pairs; and obtaining a rotation Euler angle at a minimum distance sum of the feature point pairs in a rotation process of the spherical image, and being defined as the right rotation Euler angle between each spherical image and the adjacent spherical image for each spherical image.

Where in the second embodiment of the present invention, a step of aligning the second left panorama image to the first left panorama image and calculating to obtain a second left rotation matrix, may further comprise steps of:

mapping the first left panorama image to a first cube, and mapping the second left panorama image to a second cube;

extracting feature point pairs of each face of both the first cube and the second cube respectively; and calculating an optimal second left rotation matrix to minimize a sum of the distances of the feature point pairs.

The step of aligning the second right panorama image to the first right panorama image and calculating to obtain a second right rotation matrix, may further comprise steps of:

mapping the first right panorama image to a third cube, and mapping the second right panorama image to a fourth cube;

extracting feature point pairs of each face of both the third cube and the fourth cube respectively; and calculating an optimal second right rotation matrix to minimize a sum of the distances of the feature point pairs.

Third Embodiment

The third embodiment of the invention also provides a computer readable medium stored thereon computer program for electronic data exchange that enables a computer to perform a panorama image alignment method based on multipath images of the first embodiment of the invention.

Fourth Embodiment

Figure 3:
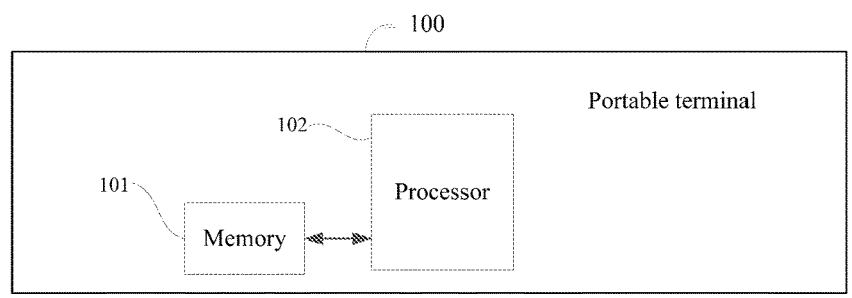
FIG. 3 is a schematic diagram illustrating a portable terminal in accordance with a fourth embodiment of the present invention.

FIG. 3 illustrates a structure diagram of the portable terminal in accordance with a fourth embodiment of the present invention, the portable terminal 100, comprises:

one or more processors 102;

a memory 101; and one or more computer programs, being stored on the memory 101, and being configured to be executed by the one or more processors, the computer program comprising computer instructions to perform the steps of:

capturing multipath spherical images used for stitching a panorama image and mapped to a unit sphere respectively;

intercepting a middle part of each spherical image, calculating a middle rotation Euler angle between each spherical image and the adjacent spherical image according to the middle part of each spherical image respectively; intercepting a left part of each spherical image, calculating a left rotation Euler angle between each spherical image and the adjacent spherical image according to the left part of each spherical image respectively to obtain a first left rotation matrix; and intercepting a right part of each spherical image, calculating a right rotation Euler angle between each spherical image and the adjacent spherical image according to the right part of each spherical image respectively to obtain a first right rotation matrix;

stitching the left part of a spherical image using the middle rotation Euler angle of all spherical images to obtain a first left panorama image; stitching the right part of a spherical image using the middle rotation Euler angle of all spherical mages to obtain a first right panorama image; stitching the left part of a spherical image using the left rotation Euler angle of all spherical images to obtain a second left panorama image; and stitching the right part of a spherical image using the right rotation Euler angle of all spherical images to obtain a second right panorama image:

aligning the second left panorama image to the first left panorama image and calculating to obtain a second left rotation matrix, and a rotation matrix of the left panorama image equal to the first left rotation matrix being multiplied by the second left rotation matrix, thereby obtaining the left rotation Euler angle of the left panorama image aligned; aligning the second right panorama image to the first right panorama image and calculating to obtain a second right rotation matrix, and a rotation matrix of the right panorama image equal to the first right rotation matrix being multiplied by the second right rotation matrix, thereby obtaining the right rotation Euler angle of the right panorama image aligned.

In the fourth embodiment, a step of intercepting a middle part of each spherical image, calculating a middle rotation Euler angle between each spherical image and the adjacent spherical image according to the middle part of each spherical image respectively, may further comprise steps of:

intercepting a middle part of each spherical image;

extracting a plurality of feature points of the middle part of each spherical image;

matching the plurality of feature points between the middle parts of each spherical image and the adjacent spherical image to obtain feature point pairs; and obtaining a rotation Euler angle at a minimum distance sum of the feature point pairs in a rotation process of the spherical image, and being defined as the middle rotation Euler angle between each spherical image and the adjacent spherical image for each spherical image.

A step of intercepting a left part of each spherical image, calculating a left rotation Euler angle between each spherical image and the adjacent spherical image according to the left part of each spherical image respectively, further comprises steps of:

intercepting a left part of each spherical image;

extracting a plurality of feature points of the left part of each spherical image;

matching the plurality of feature points between the left parts of each spherical image and the adjacent spherical image to obtain feature point pairs; and obtaining a rotation Euler angle at a minimum distance sum of the feature point pairs in a rotation process of the spherical image, and being defined as the left rotation Euler angle between each spherical image and the adjacent spherical image for each spherical image.

A step of intercepting a right part of each spherical image, calculating a right rotation Euler angle between each spherical image and the adjacent spherical image according to the right part of each spherical image respectively, further comprises steps of:

intercepting a right part of each spherical image;

extracting a plurality of feature points of the right part of each spherical image;

matching the plurality of feature points between the right parts of each spherical image and the adjacent spherical image to obtain feature point pairs; and obtaining a rotation Euler angle at a minimum distance sum of the feature point pairs in a rotation process of the spherical image, and being defined as the right rotation Euler angle between each spherical image and the adjacent spherical image for each spherical image.

In the fourth embodiment, a step of aligning the second left panorama image to the first left panorama image and calculating to obtain a second left rotation matrix, may further comprises steps of:

mapping the first left panorama image to a first cube, and mapping the second left panorama image to a second cube;

extracting feature point pairs of each face of both the first cube and the second cube respectively; and calculating an optimal second left rotation matrix to minimize a sum of the distances of the feature point pairs.

A step of aligning the second right panorama image to the first right panorama image and calculating to obtain a second right rotation matrix, may further comprise steps of:

mapping the first right panorama image to a third cube, and mapping the second right panorama image to a fourth cube;

extracting feature point pairs of each face of both the third cube and the fourth cube respectively; and calculating an optimal second right rotation matrix to minimize a sum of the distances of the feature point pairs.

In the embodiments of the present invention, due to aligning the second left panorama image to the first left panorama image and calculating to obtain a second left rotation matrix, and a rotation matrix of the left panorama image equal to the first left rotation matrix being multiplied by the second left rotation matrix, thereby obtaining the left rotation Euler angle of the left panorama image aligned; aligning the second right panorama image to the first right panorama image and calculating to obtain a second right rotation matrix, and a rotation matrix of the right panorama image equal to the first right rotation matrix being multiplied by the second right rotation matrix, thereby obtaining the right rotation Euler angle of the right panorama image aligned; therefore, the panorama image alignment based on multipath images is performed, and the 3D features of panorama image is good.

The above mentioned is preferred embodiments of the invention and is not used to limit the invention. Any changes, equivalent replacements and modifications made within the spirit and principles of the invention, shall be included in the protection scope of the invention.

What is claimed is:

1. A panorama image alignment method based on multipath images, comprising steps of:

capturing multipath spherical images used for stitching a panorama image and mapped to a unit sphere respectively;

intercepting a middle part of each spherical image, calculating a middle rotation Euler angle between each spherical image and the adjacent spherical image according to the middle part of each spherical image respectively; intercepting a left part of each spherical image, calculating a left rotation Euler angle between each spherical image and the adjacent spherical image according to the left part of each spherical image respectively to obtain a first left rotation matrix; and intercepting a right part of each spherical image, calculating a right rotation Euler angle between each spherical image and the adjacent spherical image according to the right part of each spherical image respectively to obtain a first right rotation matrix;

stitching the left part of a spherical image using the middle rotation Euler angle of all spherical images to obtain a first left panorama image; stitching the right part of a spherical image using the middle rotation Euler angle of all spherical mages to obtain a first right panorama image; stitching the left part of a spherical image using the left rotation Euler angle of all spherical images to obtain a second left panorama image; and stitching the right part of a spherical image using the right rotation Euler angle of all spherical images to obtain a second right panorama image; and aligning the second left panorama image to the first left panorama image and calculating to obtain a second left rotation matrix, and a rotation matrix of the left panorama image equal to the first left rotation matrix being multiplied by the second left rotation matrix, thereby obtaining the left rotation Euler angle of the left panorama image aligned; aligning the second right panorama image to the first right panorama image and calculating to obtain a second right rotation matrix, and a rotation matrix of the right panorama image equal to the first right rotation matrix being multiplied by the second right rotation matrix, thereby obtaining the right rotation Euler angle of the right panorama image aligned.

2. The method of claim 1, wherein a step of intercepting a middle part of each spherical image, calculating a middle rotation Euler angle between each spherical image and the adjacent spherical image according to the middle part of each spherical image respectively, further comprises steps of:
  intercepting a middle part of each spherical image;
  extracting a plurality of feature points of the middle part of each spherical image;
  matching the plurality of feature points between the middle parts of each spherical image and the adjacent spherical image to obtain feature point pairs; and
  obtaining a rotation Euler angle at a minimum distance sum of the feature point pairs in a rotation process of the spherical image, and being defined as the middle rotation Euler angle between each spherical image and the adjacent spherical image for each spherical image;
a step of intercepting a left part of each spherical image, calculating a left rotation Euler angle between each spherical image and the adjacent spherical image according to the left part of each spherical image respectively, further comprises steps of:
  intercepting a left part of each spherical image;
  extracting a plurality of feature points of the left part of each spherical image;
  matching the plurality of feature points between the left parts of each spherical image and the adjacent spherical image to obtain feature point pairs; and
  obtaining a rotation Euler angle at a minimum distance sum of the feature point pairs in a rotation process of the spherical image, and being defined as the left rotation Euler angle between each spherical image and the adjacent spherical image for each spherical image;
a step of intercepting a right part of each spherical image, calculating a right rotation Euler angle between each spherical image and the adjacent spherical image according to the right part of each spherical image respectively, further comprising steps of:
  intercepting a right part of each spherical image;
  extracting a plurality of feature points of the right part of each spherical image;
  matching the plurality of feature points between the right parts of each spherical image and the adjacent spherical image to obtain feature point pairs; and
  obtaining a rotation Euler angle at a minimum distance sum of the feature point pairs in a rotation process of the spherical image, and being defined as the right rotation Euler angle between each spherical image and the adjacent spherical image for each spherical image.

3. The method of claim 1, wherein a step of aligning the second left panorama image to the first left panorama image and calculating to obtain a second left rotation matrix, further comprising steps of:
  mapping the first left panorama image to a first cube, and mapping the second left panorama image to a second cube;
  extracting feature point pairs of each face of both the first cube and the second cube respectively; and
  calculating an optimal second left rotation matrix to minimize a sum of the distances of the feature point pairs;
a step of aligning the second right panorama image to the first right panorama image and calculating to obtain a second right rotation matrix, further comprising steps of:
  mapping the first right panorama image to a third cube, and mapping the second right panorama image to a fourth cube;
  extracting feature point pairs of each face of both the third cube and the fourth cube respectively; and
  calculating an optimal second right rotation matrix to minimize a sum of the distances of the feature point pairs.

4. A non-transitory computer readable medium stored thereon computer-executable instructions for electronic data exchange, wherein the computer-executable instructions enables one or more processors to perform a panorama image alignment method based on multipath images, the method comprising steps of:
  capturing multipath spherical images used for stitching a panorama image and mapped to a unit sphere respectively;
  intercepting a middle part of each spherical image, calculating a middle rotation Euler angle between each spherical image and the adjacent spherical image according to the middle part of each spherical image respectively; intercepting a left part of each spherical image, calculating a left rotation Euler angle between each spherical image and the adjacent spherical image according to the left part of each spherical image respectively to obtain a first left rotation matrix; and intercepting a right part of each spherical image, calculating a right rotation Euler angle between each spherical image and the adjacent spherical image according to the right part of each spherical image respectively to obtain a first right rotation matrix;
  stitching the left part of a spherical image using the middle rotation Euler angle of all spherical images to obtain a first left panorama image; stitching the right part of a spherical image using the middle rotation Euler angle of all spherical mages to obtain a first right panorama image; stitching the left part of a spherical image using the left rotation Euler angle of all spherical images to obtain a second left panorama image; and stitching the right part of a spherical image using the right rotation Euler angle of all spherical images to obtain a second right panorama image; and
  aligning the second left panorama image to the first left panorama image and calculating to obtain a second left rotation matrix, and a rotation matrix of the left panorama image equal to the first left rotation matrix being multiplied by the second left rotation matrix, thereby obtaining the left rotation Euler angle of the left panorama image aligned; aligning the second right panorama image to the first right panorama image and calculating to obtain a second right rotation matrix, and a rotation matrix of the right panorama image equal to the first right rotation matrix being multiplied by the second right rotation matrix, thereby obtaining the right rotation Euler angle of the right panorama image aligned.

5. The non-transitory computer readable medium of claim 4, wherein a step of intercepting a middle part of each spherical image, calculating a middle rotation Euler angle between each spherical image and the adjacent spherical image according to the middle part of each spherical image respectively, further comprises steps of:
  intercepting a middle part of each spherical image;
  extracting a plurality of feature points of the middle part of each spherical image;
  matching the plurality of feature points between the middle parts of each spherical image and the adjacent spherical image to obtain feature point pairs; and
  obtaining a rotation Euler angle at a minimum distance sum of the feature point pairs in a rotation process of the spherical image, and being defined as the middle rotation Euler angle between each spherical image and the adjacent spherical image for each spherical image;
a step of intercepting a left part of each spherical image, calculating a left rotation Euler angle between each spherical image and the adjacent spherical image according to the left part of each spherical image respectively, further comprises steps of:
intercepting a left part of each spherical image;
extracting a plurality of feature points of the left part of each spherical image;
matching the plurality of feature points between the left parts of each spherical image and the adjacent spherical image to obtain feature point pairs; and
obtaining a rotation Euler angle at a minimum distance sum of the feature point pairs in a rotation process of the spherical image, and being defined as the left rotation Euler angle between each spherical image and the adjacent spherical image for each spherical image;
a step of intercepting a right part of each spherical image, calculating a right rotation Euler angle between each spherical image and the adjacent spherical image according to the right part of each spherical image respectively, further comprising steps of:
intercepting a right part of each spherical image;
extracting a plurality of feature points of the right part of each spherical image;
matching the plurality of feature points between the right parts of each spherical image and the adjacent spherical image to obtain feature point pairs; and
obtaining a rotation Euler angle at a minimum distance sum of the feature point pairs in a rotation process of the spherical image, and being defined as the right rotation Euler angle between each spherical image and the adjacent spherical image for each spherical image.

6. The non-transitory computer readable medium of claim 4, wherein a step of aligning the second left panorama image to the first left panorama image and calculating to obtain a second left rotation matrix, further comprising steps of:
mapping the first left panorama image to a first cube, and mapping the second left panorama image to a second cube;
extracting feature point pairs of each face of both the first cube and the second cube respectively; and
calculating an optimal second left rotation matrix to minimize a sum of the distances of the feature point pairs;
a step of aligning the second right panorama image to the first right panorama image and calculating to obtain a second right rotation matrix, further comprising steps of:
mapping the first right panorama image to a third cube, and mapping the second right panorama image to a fourth cube;
extracting feature point pairs of each face of both the third cube and the fourth cube respectively; and
calculating an optimal second right rotation matrix to minimize a sum of the distances of the feature point pairs.

7. A portable terminal, comprising:
one or more processors;
a memory; and
one or more computer-executable instructions, being stored on the memory and configured to be executed by the one or more processors, the computer-executable instructions performing steps of:
capturing multipath spherical images used for stitching a panorama image and mapped to a unit sphere respectively;
intercepting a middle part of each spherical image, calculating a middle rotation Euler angle between each spherical image and the adjacent spherical image according to the middle part of each spherical image respectively; intercepting a left part of each spherical image, calculating a left rotation Euler angle between each spherical image and the adjacent spherical image according to the left part of each spherical image respectively to obtain a first left rotation matrix; and intercepting a right part of each spherical image, calculating a right rotation Euler angle between each spherical image and the adjacent spherical image according to the right part of each spherical image respectively to obtain a first right rotation matrix;
stitching the left part of a spherical image using the middle rotation Euler angle of all spherical images to obtain a first left panorama image; stitching the right part of a spherical image using the middle rotation Euler angle of all spherical mages to obtain a first right panorama image; stitching the left part of a spherical image using the left rotation Euler angle of all spherical images to obtain a second left panorama image; and stitching the right part of a spherical image using the right rotation Euler angle of all spherical images to obtain a second right panorama image; and
aligning the second left panorama image to the first left panorama image and calculating to obtain a second left rotation matrix, and a rotation matrix of the left panorama image equal to the first left rotation matrix being multiplied by the second left rotation matrix, thereby obtaining the left rotation Euler angle of the left panorama image aligned; aligning the second right panorama image to the first right panorama image and calculating to obtain a second right rotation matrix, and a rotation matrix of the right panorama image equal to the first right rotation matrix being multiplied by the second right rotation matrix, thereby obtaining the right rotation Euler angle of the right panorama image aligned.

8. The portable terminal of claim 7, wherein a step of intercepting a middle part of each spherical image, calculating a middle rotation Euler angle between each spherical image and the adjacent spherical image according to the middle part of each spherical image respectively, further comprises steps of:
intercepting a middle part of each spherical image;
extracting a plurality of feature points of the middle part of each spherical image;
matching the plurality of feature points between the middle parts of each spherical image and the adjacent spherical image to obtain feature point pairs; and
obtaining a rotation Euler angle at a minimum distance sum of the feature point pairs in a rotation process of the spherical image, and being defined as the middle rotation Euler angle between each spherical image and the adjacent spherical image for each spherical image;
a step of intercepting a left part of each spherical image, calculating a left rotation Euler angle between each spherical image and the adjacent spherical image according to the left part of each spherical image respectively, further comprises steps of:
intercepting a left part of each spherical image;
extracting a plurality of feature points of the left part of each spherical image;

matching the plurality of feature points between the left parts of each spherical image and the adjacent spherical image to obtain feature point pairs; and obtaining a rotation Euler angle at a minimum distance sum of the feature point pairs in a rotation process of the spherical image, and being defined as the left rotation Euler angle between each spherical image and the adjacent spherical image for each spherical image;

a step of intercepting a right part of each spherical image, calculating a right rotation Euler angle between each spherical image and the adjacent spherical image according to the right part of each spherical image respectively, further comprising steps of:

intercepting a right part of each spherical image;

extracting a plurality of feature points of the right part of each spherical image;

matching the plurality of feature points between the right parts of each spherical image and the adjacent spherical image to obtain feature point pairs; and obtaining a rotation Euler angle at a minimum distance sum of the feature point pairs in a rotation process of the spherical image, and being defined as the right rotation Euler angle between each spherical image and the adjacent spherical image for each spherical image.

9. The portable terminal of claim 7, wherein a step of aligning the second left panorama image to the first left panorama image and calculating to obtain a second left rotation matrix, further comprising steps of:

mapping the first left panorama image to a first cube, and mapping the second left panorama image to a second cube;

extracting feature point pairs of each face of both the first cube and the second cube respectively; and calculating an optimal second left rotation matrix to minimize a sum of the distances of the feature point pairs;

a step of aligning the second right panorama image to the first right panorama image and calculating to obtain a second right rotation matrix, further comprising steps of:

mapping the first right panorama image to a third cube, and mapping the second right panorama image to a fourth cube;

extracting feature point pairs of each face of both the third cube and the fourth cube respectively; and calculating an optimal second right rotation matrix to minimize a sum of the distances of the feature point pairs.

* * * * *